United States Patent
Whinnery et al.

[11] Patent Number: 6,087,024
[45] Date of Patent: *Jul. 11, 2000

[54] METHOD FOR FORMING POROUS SINTERED BODIES WITH CONTROLLED PORE STRUCTURE

[76] Inventors: LeRoy Louis Whinnery, 4929 Julie St.; Monte Carl Nichols, 4070 Guilford Ave., both of Livermore, Alameda County, Calif. 94550

[*] Notice: This patent issued on a continued prosecution application filed under 37 CFR 1.53(d), and is subject to the twenty year patent term provisions of 35 U.S.C. 154(a)(2).

[21] Appl. No.: 08/768,258

[22] Filed: Dec. 17, 1996

[51] Int. Cl.[7] .............................. B32B 5/18; C04B 38/06; C04B 35/52; B29C 65/00

[52] U.S. Cl. ............................ 428/613; 264/42; 264/44; 501/81; 501/88

[58] Field of Search ................................ 428/613, 307.3; 264/44, 42; 501/84, 87, 96.1, 88, 81

[56] References Cited

U.S. PATENT DOCUMENTS

| | | | |
|---|---|---|---|
| 3,485,904 | 12/1969 | Ostrowski | 264/63 |
| 3,833,386 | 9/1974 | Wood et al. | 106/41 |
| 3,897,221 | 7/1975 | Salyer et al. | 428/566 |
| 3,946,039 | 3/1976 | Walz | 264/332 |
| 4,289,720 | 9/1981 | Yajima et al. | 264/63 |
| 4,371,484 | 2/1983 | Inukai et al. | 264/44 |
| 4,664,858 | 5/1987 | Kido et al. | 264/44 |
| 4,713,277 | 12/1987 | Akiyama et al. | 428/131 |
| 4,767,876 | 8/1988 | Seyferth et al. | 556/410 |
| 4,943,596 | 7/1990 | Gross et al. | 521/82 |
| 4,973,435 | 11/1990 | Jain et al. | 264/29.6 |
| 5,008,422 | 4/1991 | Blum et al. | 556/412 |
| 5,154,970 | 10/1992 | Kaplan | 428/304.4 |
| 5,213,612 | 5/1993 | Minnear et al. | 75/415 |
| 5,248,462 | 9/1993 | Brotz | 264/42 |
| 5,275,980 | 1/1994 | Schilling, Jr. et al. | 501/87 |
| 5,283,019 | 2/1994 | Atwell et al. | 264/44 |
| 5,545,687 | 8/1996 | Burns et al. | 524/701 |
| 5,676,745 | 10/1997 | Kelly et al. | 106/35 |
| 5,789,460 | 8/1998 | Harkness et al. | 522/148 |

Primary Examiner—Paul Thibodeau
Assistant Examiner—Holly C. Richman
Attorney, Agent, or Firm—Timothy Evans

[57] ABSTRACT

The present invention is based, in part, on a method for combining a mixture of hydroxide and hydride functional siloxanes to form a polysiloxane polymer foam, that leaves no residue (zero char yield) upon thermal decomposition, with ceramic and/or metal powders and appropriate catalysts to produce porous foam structures having compositions, densities, porosities and structures not previously attainable. The siloxanes are mixed with the ceramic and/or metal powder, wherein the powder has a particle size of about 400 $\mu$m or less, a catalyst is added causing the siloxanes to foam and crosslink, thereby forming a polysiloxane polymer foam having the metal or ceramic powder dispersed therein. The polymer foam is heated to thermally decompose the polymer foam and sinter the powder particles together. Because the system is completely nonaqueous, this method further provides for incorporating reactive metals such as magnesium and aluminum, which can be further processed, into the foam structure.

32 Claims, 3 Drawing Sheets

METHOD FOR FORMING POROUS SINTERED BODIES WITH CONTROLLED PORE STRUCTURE

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

The present invention pertains generally to a method for fabricating porous sintered structures and particularly to a method for fabricating sintered foam materials having controlled composition and structure.

Porous structures, metallic as well as ceramic, occupy an important role in technology particularly as materials of construction, heat exchangers, high temperature filters, catalyst supports, and artificial bone and many methods are presently utilized for producing these porous structures. Among the more prominent are conventional powder metallurgical techniques. Generally, powder metallurgical processes involve the steps of shaping metal powder into green compacts by such techniques as loose packing, tamping, compaction, extrusion, rolling or the like and then consolidating the green composite so formed by sintering. Porosity is controlled mainly by particle size, particle size distribution, particle shape and compacting pressure techniques. However, it is difficult to control important physical parameters such as pore size, density and surface area by this technique.

Because of their high strength to weight ratios the class of porous materials known collectively as metallic or ceramic foams are particularly desirable porous structures. However, foams comprising ceramic materials such as magnesia, alumina, silicon carbide, boron nitride and the like; refractory metals such as tungsten or molybdenum; or multiple component materials such as mullite or cermets are difficult to produce. For these reasons, significant effort has been put forth to devise a process to fabricate metallic and ceramic foams.

Metal foam structures can be prepared by blowing a gas through a molten metal followed by rapid solidification to lock in the porous structure or by adding a foaming agent to the molten metal as described, for example, in U.S. Pat. No. 4,713,277. However, it is very difficult to control the porosity in either of these two methods.

As disclosed in U.S. Pat. No. 5,154,970, a open porosity substrate such as a reticulated organic material can serve as a skeleton to define the geometry of the structure. A coating can then deposited thereon, for example, by chemical vapor deposition or dipping as disclosed in U.S. Pat. No. 4,371,484. The substrate can then be burned or leached out, if desired, thereby forming a foam structure.

U.S. Pat. Nos. 3,946,039, 4,664,858 and 5,248,462 disclose investment casting type processes, and variations thereon, for preparing reticulated SiC or other refractory structures. However, none of these methods can provide microporous foams and, in particular, they cannot be used to produce multiple component foams. Infiltration methods can be used for reducing porosity or pore volume but the process is very time consuming and expensive and it is difficult to achieve uniformity. All these methods of preparing foams or porous materials suffer from the disadvantage that fabrication is difficult and/or time consuming and processing costs are high.

Another approach to preparing metallic and/or ceramic foams comprises dispersing metallic or ceramic powders in an organic polymer, thermally decomposing the organic polymer matrix, and sintering the residual powders together. U.S. Pat. No. 4,973,435 discloses dispersing ceramic powder particles in a solution of an organic polymer such as polyacrylonitrile or its coploymers; evaporating the solvent; thermally decomposing the polymer matrix, leaving behind a carbon residue; and sintering the carbon/ceramic powder mixture. The carbon residue from the thermal decomposition of the polymer reacts with the ceramic powder during the sintering step to provide porosity.

U.S. Pat. No. 3,897,221 discloses a method for preparing porous metal structures wherein metal powder is mixed with a solution of polyurethane forming reactants, the polyurethane is caused to gel, the solvent is extracted from the gel, the polyurethane skeleton is removed by thermal decomposition and the metal powder sintered. While this method is capable of forming controlled open pore metal structures it is difficult to produce a uniformly dense structure because of settling of the metal powder during the gelation step. Further, the thermal decomposition of polyurethane leaves a carbon residue that can only be removed by special treatment either during or subsequent to the sintering step.

U.S. Pat. No. 3,833,386 teaches a method for preparing porous ceramic structures by using hydrophilic crosslinked polyurethane foams as a carrier. Generally, an isocyanate capped polyoxyethylene polyol is combined with an aqueous slurry of a sinterable material to which a crosslinking agent can be added, and foaming is effected by reaction of the polyol with water. The rigid foam is thermally decomposed during the subsequent sintering step. This method suffers from the disadvantage that it cannot be used for water soluble or water sensitive materials.

U.S. Pat. No. 5,283,019 discloses a method for preparing porous silicon carbide ceramics using filled polysiloxanes. Here a siloxane is dissolved in an appropriate solvent and SiC powder having a particle size of less than about 10 $\mu$m is added to the solution. The solvent is evaporated and the resulting powder (a heterogeneous mixture of polymer and SiC powder) is pressed into a shape and sintered. Porosity results from voids left by the thermal decomposition of the siloxane polymer matrix. This method is limited to production of porous SiC bodies and suffers from the disadvantages that it is necessary to ensure SiC particles remain suspended during processing of the solution in order to produce a uniform ceramic, thereby limiting the particle size of metal powder that can be used. The process as disclosed, further requires the step of dissolving the siloxane precursor followed by the step of removing the solvent which necessitates processing solvent and the siloxane polymers employed leave a carbon residue which can be undesirable.

U.S. Pat. No. 5,213,612 discloses a process for making porous tungsten or molybdenum bodies, by mixing together a metal powder, wherein the metal powder has a particle size of 10 $\mu$m or less, and a foaming agent and the mixture caused to foam. Foaming is accomplished by mixing a suitable foaming agent, preferably isocyanate capped polyoxyethylene polyol with water. The self-supporting foam/metal product is heated in a reducing atmosphere to thermally decompose the foam and sinter the metal powder. A carbon residue is left from the thermal decomposition of the foam.

U.S. Pat. No. 4,371,484 discloses a method for making porous calcium phosphate bodies by dipping a porous organic material having fine channels into a slurry of calcium phosphate, to which a foaming agent has been added, heating the porous body to decompose the organic material and sintering the residue to form a porous sintered ceramic body.

What is needed is a method for preparing porous ceramic or metal bodies by pyrolysis of curable organic polymers that have metallic or ceramic powders dispersed therein, such that powders can be greater than 10 μm in size can be used, water is not required as a reagent, thermal decomposition of the polymer substrate does not leave a residue, and solvents are not required.

SUMMARY OF THE INVENTION

The present invention is directed, in part, to a method for making porous ceramic or metallic foams having controlled composition and porosity including multicomponent porous structures particularly desirable as catalysts and supported catalysts. According to the method disclosed herein, a powder or particulate material can be incorporated as a suspension into a mixture of a hydroxide functional siloxane and a hydride functional siloxane in the presence or absence of a third component which can be a diluent or a sintering or processing aid. The powder and/or particulate material can include but is not limited to metal, metal oxide, ceramic, various metal salts such as carbonates and nitrates, carbon or mixtures thereof. The mixture can be poured into a container or a mold. A catalyst can be added to cause the siloxane mixture to crosslink, forming a polysiloxane polymer having the powder uniformly distributed throughout the polymer, and simultaneously releasing a gas, thereby causing the polysiloxane polymer to foam. The process of crosslinking locks in the porous foam morphology formed by hydrogen gas produced by the crosslinking reaction. Upon heating, the polysiloxane polymer thermally decomposes, vaporizing completely (zero char yield), leaving behind a metal or ceramic powder structure having a porous foam morphology. Following thermal decomposition of the polysiloxane polymer, the porous ceramic or metal foam structure remaining can be treated by sintering in an appropriate atmosphere and/or exposed to chemical reactants, radiation, photolysis, and combinations thereof to provide a unique material having a porous structure. Moreover, the inventors have discovered that it is possible to reprocess the polysiloxane foam structure to form a multicomponent porous foam structure. Further, by proper control of processing variables it is possible to produce a foam structure such that the various components are contained in a matrix but not in contact with one another. By controlling the conditions of the foaming process the inventors have discovered that it is possible to produce porous sintered ceramic or metal bodies having compositions, densities, structures, and porosities heretofore unattainable.

DETAILED DESCRIPTION OF THE INVENTION

The present invention is based, in part, on the discovery of a method for combining hydroxide and hydride functional siloxanes, that leave no residue upon thermal decomposition (zero char yield), with ceramic, or metal powders to produce porous ceramic or metallic foam structures having compositions, densities, porosities and structures not previously attainable. Further, the present method provides for producing multicomponent porous foam structures particularly desirable as catalysts and supported catalysts. The method disclosed herein distinguishes over prior art by not requiring the use of a solvent to prepare the precursor polymer material, the absence of water as a foaming catalyst and providing the capability to use metal or ceramic powders having a particle size of 400 μm or less. The term foam as used herein is a material characterized by a three-dimensional interconnecting network of struts, which can be porous, generally having open connectivity to all pores.

Figure 2:
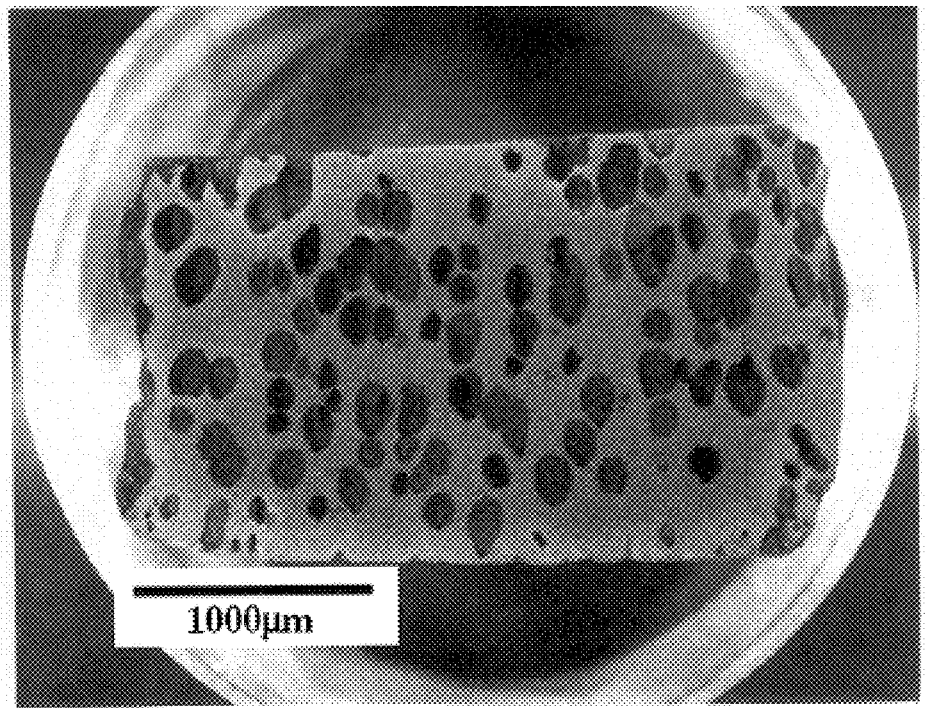
FIG. 2 is a cross-section of a copper metal foam.
Figure 3:
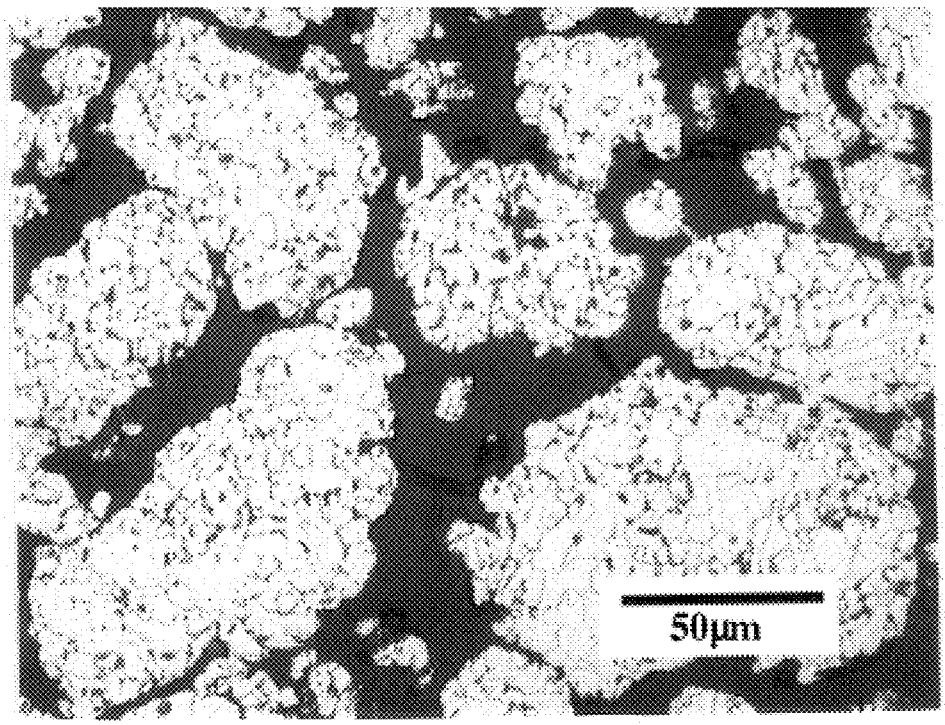
FIG. 3 shows the microstructure of a copper metal foam.

The porous bodies produced by the method of this invention can have controlled open porosity (as much as 80%), low firing shrinkage (2–25%) with low shrinkage variation, a unique pore morphology, shown in FIGS. 2 and 3, comprising macropores resulting from bubbles formed in the polysiloxane polymer foam structure by the foaming step (FIG. 2) and mesoporosity resulting from loss of the polymer network (FIG. 3), and high surface area. The ability to produce foams having these unique attributes results from controlling the conditions under which the foam is generated, such as temperature and viscosity of the polymer/powder suspension, thereby controlling the macro and microstructure of the resulting foam.

Figure 1:
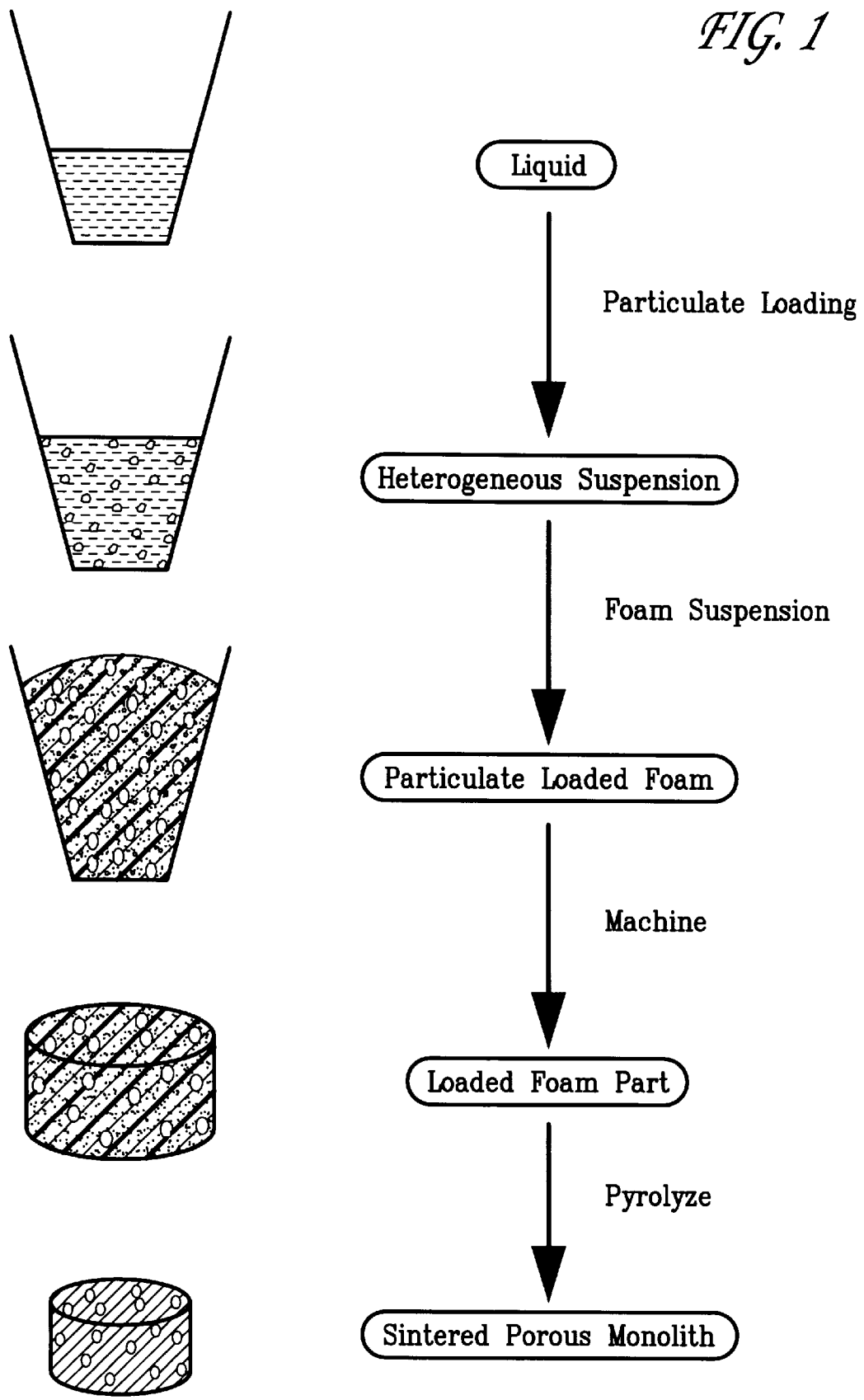
FIG. 1 is a flowchart showing the method of the present invention.

As shown in FIG. 1, the present invention is based, in part, on the discovery that porous metal or ceramic foam structures can be prepared by a method comprising the steps of;

a) dispersing a powdered material and a catalyst in a mixture of a hydroxide and a hydride functional siloxane (generally in about a 1:1 ratio by weight) to form a uniform suspension;

b) foaming and crosslinking the suspension to form a polysiloxane polymer foam having the powdered material uniformly dispersed therein; and c) heating the polysiloxane polymer foam to temperatures greater than about 600° C. to thermally decompose the polymer foam and sinter the powdered material to form a porous sintered body.

The mixtures used to prepare the porous bodies of the present invention comprise a hydroxide functional siloxane and a hydride functional siloxane such as hydroxy terminated polydimethylsiloxane and polymethylhydrosiloxane-polydimethylsiloxane copolymer, a powder or particulate material having an average particle size of less than about 400 μm and a catalyst that can be bis (2-ethyl-hexanoate)tin, dibutlydilauryltin, zinc octoate, and iron octoate, and preferably tin octoate. Other desirable processing aids such as sintering aids can also be added. The mixture of hydroxide and hydride functional siloxanes and the powdered material are thoroughly mixed in a manner to ensure a uniform suspension. A catalyst can be added to the mixture to cause the siloxane mixture to foam and crosslink to form a polysiloxane polymer foam.

By controlling the viscosity of the hydroxide and hydride functional siloxane mixture the size of the pores formed in the foam can be controlled. The viscosity of the siloxane mixture can be changed in various ways such as; by the addition of organic liquids, such as cyclohexane, by using different siloxanes having higher or lower molecular weights or viscosities, or by changing the temperature of the suspension.

The hydroxide and hydride functional siloxanes useful for the present invention are known in the art. The primary requirement being that after crosslinking and foaming the polysiloxane polymer product thermally decompose leaving no residue (zero char yield) when subjected to elevated temperatures (generally temperatures in excess of 600° C.) in a reducing, inert or vacuum atmosphere. Further, a smooth and uniform thermal degradation of the siloxanes is required in order to maintain the macrostructure of the foam as well as mimize distortions and shrinkage. Hydroxide and hydride functional siloxanes that have been found useful can include hydroxy terminated polydimethylsiloxane and polymethylhydrosiloxane-polydimethylsiloxane copolymer. This particular class of hydride functional siloxanes is particularly desirable for forming foam structures in that, in contrast to isocyanates such as those described in U.S. Pat. No. 5,213,612, they do not require water to catalyze the foaming reaction and thus are desirable to use with metal or ceramic powders that are sensitive to or react with water, such as magnesium.

Further, in contrast to the prior art, it is desirable, for the purposes of the present invention, that upon thermal decomposition the polysiloxane polymer foam have zero char yield. In this way, the composition of the final porous foam and/or ceramic powder(s) added.

The powdered material dispersed into the mixture of hydroxide and hydride functional siloxanes can be metal and/or ceramic powders such as, carbides, nitrides, suicides, alumina, mullite, zeolites, stainless steels, nickel, quartz, carbon, beryllium, and metal salts such as carbonates, and nitrates and combinations thereof. Further, the inventors have discovered that by combining powders it is possible to produce multi-component foam structures. By way of example, $SiO_2$ and $Al_2O_3$ powders can be combined with the polysiloxane polymer to yield a porous mullite ($3Al_2O_3.2SiO_2$) foam; carbon and silicon or silicon dioxide powders can be combined with the polysiloxane polymer to yield a porous SiC structure. Analogous multi-component foam structures are contemplated by this invention.

Because the method disclosed herein provides the ability to form structures with high porosity and surface area, it has been discovered that it is possible to produce highly effective catalyst compositions. By mixing together Mg, Ni and $CaCO_3$ powders along with the hydroxide and hydride functional siloxanes and sintering the mixture, a Ni/CaO catalyst supported on MgO can be formed. In the same manner, by mixing together Al, Ni and $CaCO_3$ powders along with hydroxide and hydride functional siloxanes a Ni/CaO catalyst supported on $Al_2O_3$ can be prepared. Other catalyst compositions that can be formed by the present invention, in the manner illustrated above, will be obvious to those skilled in the art.

By converting the loaded polysiloxane foam to a powder and using the powdered loaded foam as a starting ingredient, the inventors have shown that it is possible to produce multicomponent mixtures, wherein the components are supported in a matrix material but are not in contact with one another.

It is known in the art that forming ceramic foam structures having high and controlled porosity is very difficult. However, the present invention enables the production of just such ceramic structures. By way of example, mixing together magnesium metal powder and hydroxide and hydride functional siloxanes, in the manner set forth above, and sintering the foamed crosslinked polysiloxane polymer structure in a reducing atmosphere it is possible to produce a porous MgO foam structure. It is believed that the MgO results from the reaction of magnesium metal with the oxygen present in the crosslinked polysiloxane polymer.

Porous alumina ($Al_2O_3$) structures can be produced by substituting aluminum metal powder for magnesium powder. While previous methods of sintering MgO, in the absence of a sintering aid, require temperatures above 1900° C., the present invention can be used to prepare sintered MgO at much lower temperatures ($\approx$800° C.).

Following the step of crosslinking and foaming, the crosslinked polysiloxane polymer foam loaded with powder(s) is heated to produce the final consolidated product. The step of heating can consist of two parts; the first, wherein the loaded polysiloxane polymer foam can be heated to a temperature sufficient to thermally decompose the polysiloxane polymer matrix material completely, and the second, wherein the porous intermediate structure that results from the thermal decomposition of the loaded foam is sintered by heating to temperatures sufficient to cause strengthening of the structure. Prior to the second heating or sintering step the porous intermediate structure can be subjected to a separate treatment. Such treatment can include exposing the porous intermediate structure to photolysis, radiation, further chemical reaction, impregnation by additional phases, or combinations thereof. The step of sintering takes place preferably in a reducing atmosphere, although an inert atmosphere or vacuum are also suitable. The most desirable sintering conditions such as atmosphere, heating rate and temperature depend on the composition of the foam structure, the particle size, presence of sintering aids, and the properties desired in the final foam structure.

It should be noted that the loaded polysiloxane foam structure produced by the present method takes the shape of the container or mold, thereby permitting fabrication of near net shape materials. However, sometimes it can be desirable to machine or otherwise form the loaded polysiloxane foam structure. It will be appreciated that machining or other forming operations are generally easier to accomplish on the loaded foam structure, prior to sintering. The loaded polysiloxane foam disclosed herein is capable of withstanding normal handling and can be easily machined or otherwise fabricated.

So that those skilled in the art can better appreciate and understand this invention, the following examples are given.

EXAMPLE 1

Copper powder (U.S. Bronze, Grade 273, 150 g) was added with stirring to a 250 ml plastic beaker containing a mixture of hydroxy terminated polydimethylsiloxane (Gelest, DMS-S27, 25.2 g), and polymethylhydrosiloxane-polydimethylsiloxane copolymer (Gelest, HMS-151, 24.9 g). The resulting thick slurry was placed in an oven at 75° C. (to accelerate foaming) in an air atmosphere for 35 minutes. The sample was removed and thoroughly mixed before adding 1.1 g of tin octoate catalyst to induce bubble formation and crosslinking of the polymers to form a solid material. After stirring in the catalyst for 2–3 minutes, the beaker was placed back in the 75° C. oven and kept there overnight at 75° C. The foamed and cured sample was removed from the oven and a band saw was used to remove a slice (approximately 2.5 inch dia, 0.75 inch thick) from the middle of the foam structure. The disk shaped sample was heated in a Lindberg tube furnace at 820° C. for 5 hours (1°/min ramp) in a 5% hydrogen/95% argon (2l/min) atmosphere. After cooling to room temperature overnight the sintered sample was removed. The siloxane polymer had volatilized leaving only the porous copper behind in the shape of the polymer. Moderate shrinkage (approx 25%) was observed. The bulk density of the sample was approximately 3.8 g/cm$^3$ corresponding to a void volume fraction of 60%. FIGS. 2 and 3 show the structure of the copper foam. FIG. 2 shows the visually observed pore structure produced by bubbles in the foam and FIG. 3 shows microporosity resulting from loss of the polysiloxane polymer. The overall structure is very open with a high surface area ($\approx 20$ m$^2$/g).

EXAMPLE 2

A 250 ml plastic beaker was charged with a mixture of polymethylhydrosiloxane-polydimethylsiloxane copolymer (Gelest, HMS-151, 25.3 g), hydroxy terminated polydimethylsiloxane (Gelest, DMS-S27, 24.7 g), and aluminum (Valimet, −325 mesh, dried at 110° C., 400 g). The siloxane mixture and the aluminum powder were thoroughly mixed and 1.1 g of tin octoate catalyst was stirred into the mixture. The aluminum loaded siloxane foam was fairly well set after 2 hours at room temperature. A slice (approximately 0.75 inches) of the aluminum loaded siloxane foam was heated in a Lindberg furnace to 580° C. and held at that temperature for 10 hours (1 ° C./min ramp) in an atmosphere of 5% hydrogen/95% argon flowing at 2 l/min. Cooling overnight yielded a porous aluminum sample in the shape of the siloxane polymer foam. Only minimal shrinkage was observed.

EXAMPLE 3

A siloxane mixture was prepared as in Example 2. Then iron (Matheson, electrolytic, 150 g) was stirred into the siloxane mixture. The open beaker was placed into an oven with an air atmosphere at 75° C. for approximately 1 hr. Stannous octoate in polydimethylsiloxane (General Electric, 1.2 g) was added to the still hot beaker with immediate and thorough stirring. The mixture started to gel and foam immediately. The mixture was heated in an oven (air, 75° C.) for 1 hr producing a rubber foam material with iron particles distributed throughout the polymer network.

Figure 4:
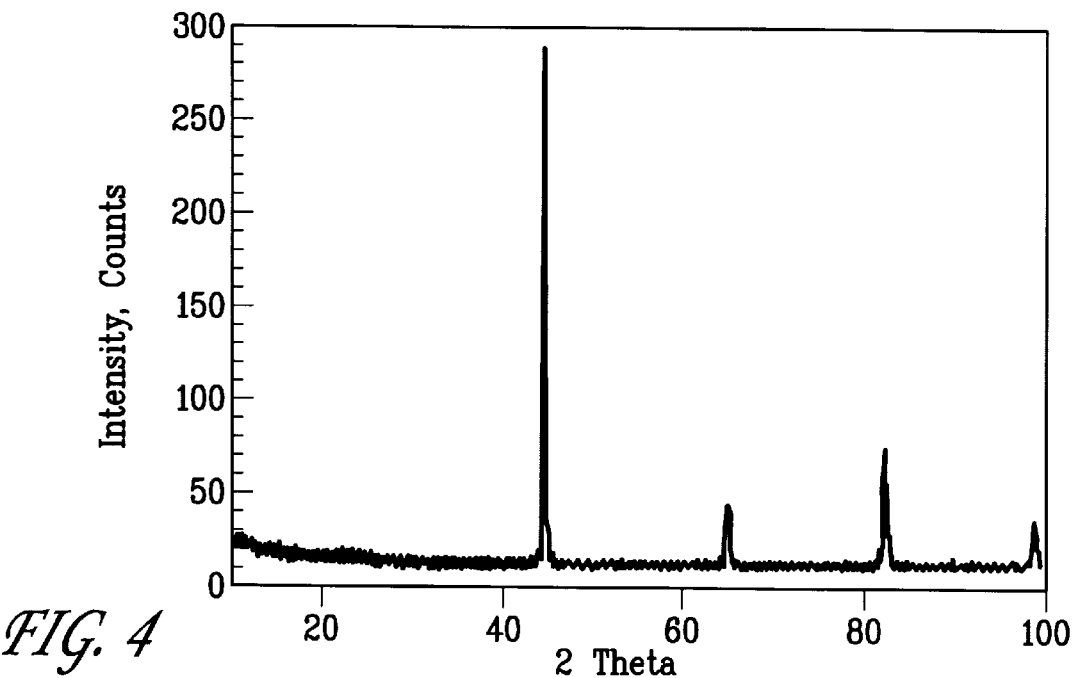
FIG. 4 shows the x-ray diffraction spectrum of an iron foam.

A machined disk of the polysiloxane/Fe sample was heated in a 5% hydrogen/95% argon atmosphere (2 l/min) at 5° C./min to 1000° C. and held at that temperature for 2 hr. Minimal shrinkage was observed while producing a porous magnetic Fe monolith with modest strength. Additional heating in He at 50° C./min to 1300° C. for 1 hr produced a more robust sample. The x-ray spectrum of the sample is shown in FIG. 4.

EXAMPLE 4

A siloxane mixture was prepared as in Example 2. Then magnesium metal powder (ROC/RIC, −325 mesh, 50.0 g) was stirred into the siloxane mixture. The open beaker was placed into the an oven with an air atmosphere at 75° C. for approximately 4 hr. Stannous octoate in polydimethyl siloxane (General Electric, 1.2 g) was added to the still hot beaker with immediate and thorough stirring. The mixture started to gel and foam immediately. The mixture was heated in an oven (air, 75° C.) for 2 hr producing a rubber foam material with Mg particles distributed throughout the polymer network.

Figure 5:
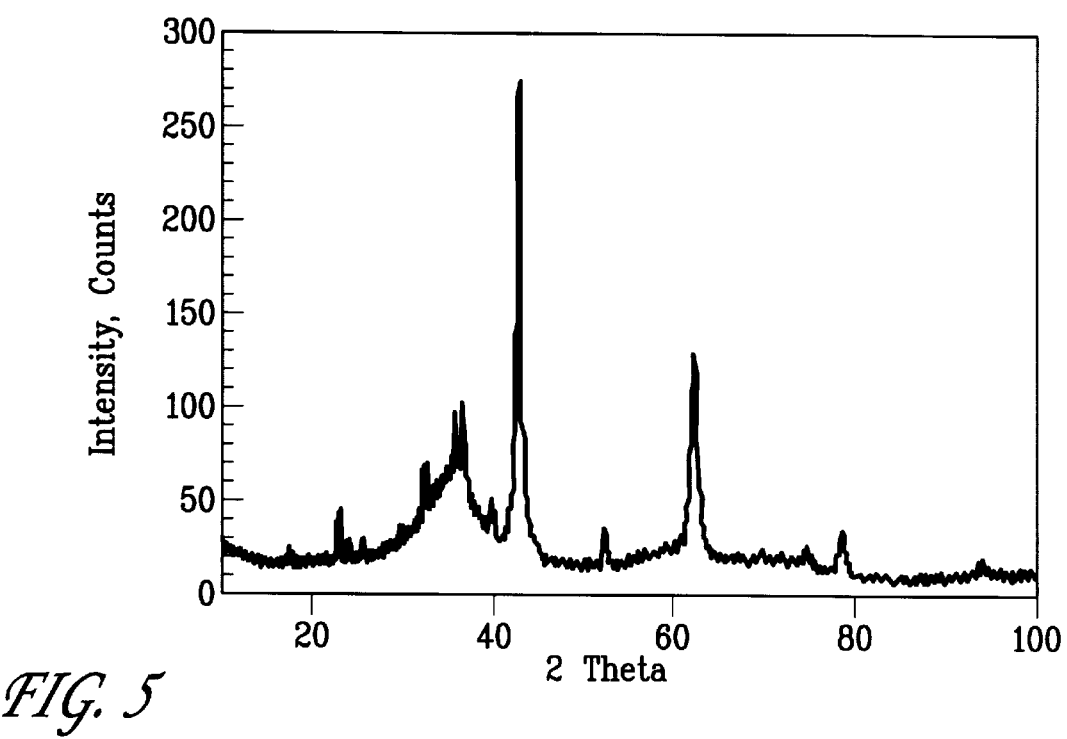
FIG. 5 shows the x-ray diffraction spectrum of a MgO foam.

A machined disk of the polysiloxane/Mg sample was heated in a 5% hydrogen/95% argon atmosphere (2 l/m) at 5° C./min to 1000° C. at held at that temperature for 2 hr. A porous MgO monolith was produced and minimal shrinkage was observed. The x-ray spectrum (shown in FIG. 5) is consistent with MgO as the major constituent and a small amount of Mg$_2$SiO$_4$. The BET surface area was determined to be 3 m$^2$/g, significantly higher than the geometric surface area.

EXAMPLE 5

A siloxane mixture was prepared as in Example 2. Magnesium metal powder (Alfa/AESAR, −325 mesh, 30.0 g) was added to the siloxane mixture and mixed by hand. Then CaCO$_3$ powder (Aldrich, 10 μm, 3.4 g) was stirred into the siloxane/magnesium mixture. The open beaker was placed into an oven with an air atmosphere at 65° C. for approximately 1 hr. Stannous octoate in polydimethyl siloxane (General Electric, 1.1 g) was added to the still hot beaker with immediate and thorough stirring. The mixture started to gel and foam immediately. The mixture was heated in an oven (air) for 1 hr producing a rubber foam material with Mg and CaCO$_3$ particles distributed throughout the polymer network.

A machined disk of the polysiloxane/Mg/CaCO$_3$ sample was heated in a 5% hydrogen/95% argon atmosphere (3 l/min) to 1000° C. and held at that temperature for 2 hr. The following heating schedule was used: 2° C./min to 300° C., 1° C./min to 500° C., and 2° C./min to 1000° C. No shrinkage in the thickness of the sample and a 3% shrinkage in the diameter and was observed.

In some instances it is desirable to produce a multicomponent mixture, wherein the components are contained in a matrix but are separated. The following examples illustrate how the method disclosed herein can accomplish that purpose.

EXAMPLE 6

A siloxane mixture was prepared as in Example 2. Then CaCO$_3$ powder (Aldrich, 10 μm, 50.0 g) was stirred into the siloxane mixture. The open beaker was placed into an oven in an air atmosphere at 65° C. for approximately 1 hr. Stannous octoate in polydimethyl siloxane (General Electric, 1.1 g) was added to the still hot beaker with immediate and thorough stirring. The mixture started to gel and foam immediately. The mixture was heated in an oven (air 65° C.) for 30 min producing a rubber foam material with CaCO$_3$ particles distributed throughout the polymer network. The sample was ground in a blender until a particle size of about 2 mm or less was achieved. About 15.0 g of the CaCO$_3$/siloxane foam particles were stirred into a 500 ml plastic beaker containing a mixture of polymethylhydrosiloxane-polydimethylsiloxane copolymer (Gelest, HMS-151, 24.9 g), hydroxy terminated polydimethylsiloxane (Gelest, DMS-S27, 25.0 g), and Mg metal powder (Alfa/AESAR, −325 mesh, 30.0 g). The resulting mixture was heated in an oven (air) at 65° C. for approximately 1 hr, followed by addition of stannous octoate in polydimethyl siloxane (General Electric, 1.1 g) with stirring, and additional heating at 65° C. for 1 hr.

A machined disk of the polysiloxane/Mg/CaCO$_3$ sample was heated in a 5% hydrogen/95% argon atmosphere (3 l/min) to 1000° C. and held at that temperature for 2 hr. The following heating schedule was used: 2° C./min to 300° C., 1° C./min to 500° C., and 2° C./min to 1000° C. The resulting porous foam structure contained clusters ($\approx 2$ mm) of CaO powder particles (<44 μm) supported within a MgO matrix.

EXAMPLE 7

A siloxane mixture was prepared as in Example 2 and magnesium (ROC/RIC, −325 mesh, 30.1 g) and mixed by hand. Then CaCO$_3$ powder (Aldrich, 10 μm, 15.0 g) was stirred into the siloxane mixture. The open beaker was placed into an oven with an air atmosphere at 75° C. for approximately 1 hr. Stannous octoate in polydimethyl siloxane (General Electric, 1.1 g) was added to the still hot beaker with immediate and thorough stirring. The mixture started to gel and foam immediately. The mixture was heated in an oven (air 75° C.) for 30 min producing a rubber foam material with CaCO$_3$ and Mg particles distributed throughout the polymer network. The sample was ground in a blender until a particle size of about 2 mm or less was achieved. About 50.5 g of the CaCO$_3$/Mg/siloxane foam particles were stirred into a 500 ml plastic beaker containing a mixture of polymethylhydrosiloxane-polydimethylsiloxane copolymer (Gelest, HMS-151, 35.0 g), hydroxy terminated polydimethylsiloxane (Gelest, DMS-S27, 35.3 g), Mg metal powder (Alfa/AESAR, –325 mesh, 20.0 g), and Ni metal powder (ROC/RIC, –325 mesh, 35.0 g). The resulting mixture was heated in an oven (air) at 50° C. for approximately 2 hr, followed by addition of stannous octoate in polydimethyl siloxane (General Electric, 1.1 g) with stirring, and additional heating at 50° C. for 1 hr.

A machined disk of the polysiloxane/Mg/CaCO$_3$/Mg/Mg-Ni sample was heated in a 5% hydrogen/95% argon atmosphere (2 l/min) at 2° C./min to 1000° C. and held at that temperature for 2 hr. X-ray microfluorescence confirmed areas of high Ca with no Ni present and regions of high Ni with no Ca present, both consistent with the size and mixing methodology. Mg present as MgO was shown to be dispersed throughout the sample.

We claim:

1. A method for preparing a porous sintered body, comprising the steps of:
    a) dispersing at least one powdered material into a liquid mixture of a hydroxide functional siloxane and a hydride functional siloxane to form a uniform liquid suspension, wherein said powdered material is selected from the group comprising metals, ceramics, metal salts, and combinations thereof, said hydroxide functional siloxane and said hydride functional siloxane selected to form a crosslinked siloxane polymer in the presence of a polymerization catalyst such that said polymer thermally decomposes to leave zero char yield when heated to a temperature above about 600° C.;
    b) mixing said uniform liquid suspension together with said polymerization catalyst, said catalyst causing said siloxane mixture to initiate a crosslinking reaction while simultaneously liberating hydrogen gas, said gas causing said liquid suspension to foam, said crosslinking reaction forming a solid polymer body, wherein said solid polymer body is a foam structure having the powdered material uniformly dispersed therein; and
    c) heating the solid polymer body in a reducing atmosphere above 600° C. to form said porous sintered body.

2. The method of claim 1, wherein the hydroxide and the hydride functional siloxane are combined in a ratio of about 1:1 by weight.

3. The method of claim 1, wherein the particle size of the powdered material is less than about 400 μm.

4. The method of claim 3, wherein the powdered material is a ceramic powder selected from the group consisting of metal oxides, carbides, borides, nitrides, silicides, aluminas, mullites, zeolites, and combinations thereof.

5. The method of claim 3, wherein the powdered material is a metal salt selected from the group consisting of carbonates and nitrates.

6. The method of claim 2, wherein the hydroxide and hydride functional siloxanes consist essentially of hydroxyl terminated polydimethylsiloxane and polymethylhydrosiloxane-polydimethylsiloxane copolymer.

7. The method of claim 1, wherein the step of foaming further includes the step of adjusting the temperature of the suspension to control the rate of foam formation.

8. The method of claim 1, wherein the step of dispersing further includes the step of adding a diluent to change the viscosity of the mixture.

9. The method of claim 1, wherein the step of dispersing includes adding a sintering aid to the siloxane mixture.

10. The method of claim 1, wherein the reducing atmosphere is 5 vol % hydrogen in argon.

11. The method of claim 1, wherein said step of dispersing further includes dispersing a material produced by reducing the product of step b) to a powder.

12. A porous foam produced by the method of claim 1, wherein said powdered material is a metal selected from the group consisting of aluminum or magnesium, said metal having a particle size of less than about 400 μm, and wherein further said porous foam has a BET surface area of at least about 3 m$^2$/g.

13. A method for preparing catalysts and supported catalysts, comprising the steps of:
    a) dispersing at least one powdered material into a liquid mixture of a hydroxide functional siloxane and a hydride functional siloxane to form a uniform liquid suspension, wherein said powdered material is selected from the group comprising metals, ceramics, metal salts, and combinations thereof, said hydroxide functional siloxane and said hydride functional siloxane selected to form a crosslinked siloxane polymer in the presence of a polymerization catalyst such that said polymer thermally decomposes to leave zero char yield when heated to a temperature above about 600° C.;
    b) mixing said uniform liquid suspension together with said polymerization catalyst, said catalyst causing said siloxane mixture to initiate a crosslinking reaction while simultaneously liberating hydrogen gas, said gas causing said liquid suspension to foam, said crosslinking reaction forming a solid polymer body, wherein said solid polymer body is a foam structure having the powdered material uniformly dispersed therein;
    c) committing the solid polymer body to form a loaded polymer powder;
    d) repeating step a), wherein the powdered material is the loaded polymer powder;
    e) repeating step b) thereby forming a second solid polymer body; and
    f) heating the second solid polymer body in a reducing atmosphere at a temperature above 600° C. to form a multicomponent porous sintered body.

14. The method of claim 13, wherein the reducing atmosphere is 5 vol % hydrogen in argon.

15. The method of claim 13, wherein the hydroxide and the hydride functional siloxane are combined in a ratio of about 1:1 by weight.

16. The method of claim 13, wherein the particle size of the powdered material is less than about 400 μm.

17. The method of claim 17, wherein the powdered material is a ceramic powder selected from the group consisting of metal oxides, carbines, borides, nitrides, silicides, aluminas, mullites, zeolites, and combinations thereof.

18. The method of claim 16, wherein the powdered material is a metal salt selected from the group consisting of carbonates and nitrates.

19. The method of claim 15, wherein the hydroxide and hydride functional siloxanes consist essentially of hydroxyl terminated polydimethylsiloxane and polymethylhydrosiloxane-polydimethylsiloxane copolymer.

20. The method of claim 13, wherein the step of foaming further includes the step of adjusting the temperature of the suspension to control the rate of foam formation.

21. The method of claim 13, further including the step of adding a diluent to change the viscosity of the siloxane mixture.

22. The method of claim 13, wherein the step of dispersing includes adding a sintering aid to the siloxane mixture.

23. The method of claim 13, where said step of dispersing further include dispersing a material produced by committing the product of the step of foaming.

24. A porous catalyst produced by the method of claim 13.

25. A porous catalyst produced by the method of claim 23.

26. The method of claim 13, wherein the hydroxide and the hydride functional siloxane are combined in a ratio of about 1:1 by weight.

27. The method of claim 26, wherein the hydroxide and hydride functional siloxanes consist essentially of hydroxyl terminated polydimethylsiloxane and polymethylhydrosiloxane-polydimethylsiloxane copolymer.

28. The method of claim 13, wherein the step of foaming further includes the step of adjusting the temperature of the suspension to control the rate of foam formation.

29. The method of claim 13 further including the step of adding a diluent to change the viscosity of the siloxane mixture.

30. The method of claim 13, wherein the step of dispersing includes adding a sintering aid to the siloxane mixture.

31. A porous foam having multiple components, said foam produced by the method of claim 13, wherein said step of repeating includes adding one or more additional components selected from the list consisting of powdered metals, ceramics, metal salts, and combinations thereof.

32. A method for preparing a porous sintered body, comprising the steps of:

a) dispersing at least one powered material into a liquid siloxane mixture to from a uniform liquid suspension, said mixture consisting essentially of a hydroxy terminated polydimethylsiloxane and polymethylsiloxane-polydimethylsiloxane copolymer, wherein said powdered material is selected from the group comprising metals, ceramics, metal salts, and combinations thereof;

b) mixing said uniform liquid suspension together with said polymerization catalyst, said catalyst causing said siloxane mixture to initiate a crosslinking reaction while simultaneously liberating hydrogen gas, said gas causing said liquid suspension to foam, said crosslinking reaction forming a solid polymer body, wherein said solid polymer body is a closed cell foam structure having the powdered material uniformly dispersed therein; and c) heating the solid polymer body in a reducing atmosphere above 600° C. to form said porous sintered body.

* * * * *